US008646831B2

(12) United States Patent
Ohba et al.

(10) Patent No.: US 8,646,831 B2
(45) Date of Patent: Feb. 11, 2014

(54) MOUNTING STRUCTURE FOR AN AUTOMOTIVE EXTERIOR MEMBER

(75) Inventors: Toshiya Ohba, Saitama (JP); Yosuke Kimura, Saitama (JP); Makoto Kurita, Saitama (JP); Joseph Riggsby, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/634,684

(22) PCT Filed: Apr. 18, 2011

(86) PCT No.: PCT/JP2011/002251
§ 371 (c)(1),
(2), (4) Date: Sep. 13, 2012

(87) PCT Pub. No.: WO2011/135798
PCT Pub. Date: Nov. 3, 2011

(65) Prior Publication Data
US 2013/0001982 A1    Jan. 3, 2013

(30) Foreign Application Priority Data

Apr. 26, 2010 (JP) ................................. 2010-101419

(51) Int. Cl.
*B60N 99/00* (2006.01)
(52) U.S. Cl.
USPC .................................................. 296/193.08
(58) Field of Classification Search
USPC .......................... 296/187.11, 193.09, 193.08
See application file for complete search history.

(56) References Cited

U.S. PATENT DOCUMENTS 7,600,809 B2 * 10/2009 Boggess et al. ............... 296/191
7,717,458 B2 *  5/2010 Tsuge ......................... 280/728.2
7,841,636 B2 * 11/2010 Huth et al. .................... 296/1.08
7,931,295 B2 *  4/2011 Inui et al. .................... 280/730.2

FOREIGN PATENT DOCUMENTS

| JP | 6-270673 A    | 9/1994  |
| JP | 2001-158311 A | 6/2001  |
| JP | 2003-306095 A | 10/2003 |
| JP | 2005-059781 A | 3/2005  |
| JP | 2007-176359 A | 7/2007  |
| JP | 2007-223353 A | 9/2007  |
| JP | 2007-276606 A | 10/2007 |

* cited by examiner

*Primary Examiner* — Lori Lyjak
(74) *Attorney, Agent, or Firm* — Carrier Blackman & Associates, P.C.; Joseph P. Carrier; William D. Blackman

(57) ABSTRACT

A mounting structure for an automotive exterior member includes a mounting portion projecting from a rear side of a lower garnish so that a clip engaged by an outer panel of a tailgate is retained by the mounting portion. The mounting portion includes a base end portion on the side of the main body of the lower garnish and a projecting end portion on the side of the outer panel connected to the base end portion via a connecting portion which ruptures at the time of a crash at the lower garnish. The base end portion and the projecting portion are displaced along the projecting direction at the time of a crash. Therefore, a non-serious crash does not cause the base end portion to abut the outer panel or the projecting end portion to abut the main body of the lower garnish, and damage is limited to the deformation of the exterior member.

9 Claims, 6 Drawing Sheets

MOUNTING STRUCTURE FOR AN AUTOMOTIVE EXTERIOR MEMBER

TECHNICAL FIELD

The present invention relates to a mounting structure for an automotive exterior member, and in particular to a mounting structure for an automotive exterior member suitable for mounting a garnish to a rear end of a vehicle.

BACKGROUND ART

Conventionally, in a vehicle provided with a tailgate, an exterior member consisting of a lower garnish is often attached to an outer panel of the tailgate such as disclosed in JP 2007-176359A.

A vehicle is typically provided with a bumper on a front end thereof, and it is known to attach a bumper reinforce provided inside the bumper to a bumper stay which is provided in each side member of the vehicle. In a certain mounting structure, a positioning bolt projects forward from the mounting surface of the bumper stay for laterally positioning the bumper reinforce relative to the bumper stay, and a pair of semi-circular slits are formed in the part of the bumper stay surrounding the base end of the positioning bolt such that the two semi-circular slits are separated by a pair of bridging portions as disclosed in JP 2003-306095A. Thereby, lateral force that may be applied to the bumper stay is dispersed owing to the deformation or the shearing of the bridging portions.

BRIEF SUMMARY OF THE INVENTION

Task to be Accomplished by the Invention

Suppose that a vehicle having a tailgate fitted with a lower garnish runs into a rear end crash. If the crash is light enough to limit the damage to the deformation or the breaking of the lower garnish, it can be readily repaired by replacing the lower garnish without the need for repairing the outer panel, and the repairing cost can be minimized. Therefore, the mounting structure of the lower garnish may be such that the damage to the outer panel may be minimized. It is known to provide clip engaging holes in the outer panel, and retain clips in clip retaining portions provided in the lower garnish so that the lower garnish may be attached to the outer panel by forcing the clips into the clip engaging holes of the outer panel. In such a case, as the clip retaining portions are located adjacent to the outer panel, if the stiffness of the parts of the lower garnish provided with the clip retaining portions is high, the outer panel may be deformed by the pressure caused by the rear end crash transmitted to the outer panel via the clip mounting portions of the lower garnish. To avoid this problem, the parts of the lower garnish provided with the clip retaining portions may be given with a lower stiffness so that the impact may be absorbed by the deformation of these parts. However, in such a case, the parts of the lower garnish provided with the clip retaining portions may be deformed even under the pressure applied by a person, and the resulting tendency of the lower garnish to deform so readily under an external pressure may impair the commercial acceptance of the vehicle.

It may be conceivable to use the structure proposed in JP 2003-306095A by forming a plurality of arcuate slits separated by bridging portions around each clip retaining portion of the lower garnish so that the bridging portions may be ruptured upon occurrence of a light rear end crash. However, the structure proposed in Patent Document 2 is only able to accommodate the displacement along the surface of the clip retaining portion. Therefore, when applied to the lower garnish, this structure is only able to absorb the impact of a side crash but not that of a rear end crash.

Means to Accomplish the Task

To eliminate such problems of an exterior member attached to an outer panel of a vehicle in the conventional arrangement, and allow only the exterior member to be replaced in case of a light crash, the present invention provides a mounting structure for an automotive exterior member for attaching the exterior member to an outer surface (4) of an outer panel (2b) defining an exterior surface of a vehicle body (1), wherein: the exterior member comprises a rear side (3a) opposing an outer surface of the outer panel at a certain distance and a mounting portion (7) projecting from the rear side of the exterior member toward the outer panel for securing the exterior member to the outer panel; the mounting portion includes a base end portion (8) projecting from the rear side toward the outer surface of the outer panel, a projecting end portion (10) projecting from the base end portion toward the outer panel and configured to be connected to the outer surface of the outer panel and a connecting portion (9) connecting the projecting end portion with the base end portion; and the connecting portion is configured to be mechanically weaker than the base end portion and the projecting end portion against a crash load directed in a projecting direction of the mounting portion.

According to this arrangement, the mounting portion is located between the exterior member defining an outer surface of the vehicle body and the outer panel, and includes the base end portion located on the side of the exterior member and the projecting end portion located on the side of the outer panel. The projecting end portion projects from the base end portion toward the outer surface of the outer panel via the connecting portion. Therefore, when subjected to an impact load directed in the projecting direction of the base end portion and the projecting end portion which is perpendicular to the surface of the exterior member, the base end portion and the projecting end portion are allowed to be displaced relative to each other by a distance corresponding to the projecting length of the base end portion or the projecting end portion by the rupture of the connecting portion. Therefore, when the crash impact is small enough not to cause the base end portion to abut the outer panel or the projecting end to abut the exterior member, the resulting damage may be limited to the deformation of the exterior member, and the mounting portion is prevented from transmitting the pressure to the outer panel that may be strong enough to deform the outer panel.

Preferably, the projecting end portion (10) and the base end portion (8) are provided with wall parts (8a, 8b, 8c, 10a, 10b, 10c), respectively, that extend in the projecting direction and are joined to each other via the connecting portion, the connecting portion including a wall part (9a, 9b, 9c) that extends from the wall part of the base end portion at an angle to the projecting direction. Thereby, when an impact load is applied to the wall parts of the base end portion and the projecting end portion in the projecting direction, the wall part of the connecting portion can be preferentially ruptured in a reliable manner while the wall parts of the base end portion and the projecting end portion are relatively resistant to deformation. As the wall parts of the base end portion and the projecting end portion are located adjacent to each other, upon rupturing of the connecting portion, one of the wall parts is allowed to slide over the other. Owing to the guiding action between the two wall parts, the exterior member is prevented from coming into engagement with the outer surface of the outer panel even when an uneven deformation of the exterior member is caused. In such a case, the deformation of the mounting portion can be minimized.

The wall part of the base end portion may include a part (8a) that is located above an upper surface of the wall part of the projecting end portion. Thereby, upon rupturing of the connecting portion, the base end portion integral with the exterior member can rest upon the projecting end portion so that the rupturing of the connecting portion does not directly lead to the detachment of the exterior member.

The wall part of the connecting portion may be substantially perpendicular to the wall part of the base end portion so that the wall part of the connecting portion may be more effectively ruptured. The wall part of the connecting portion may include a thin walled portion or a plurality of openings. By providing a mechanically weakened portion that can be readily ruptured in the connecting portion such as a thin walled portion or a perforated portion, the connecting portion can be ruptured in a reliable manner.

According to a preferred embodiment of the present invention, the exterior member consists of a garnish provided with a peripheral flange (3b) extending toward the outer panel, and a part (8a) of the wall part of the base end portion is formed by the peripheral flange. Thereby, when the exterior member consists of a lower garnish forming a lower part of the tailgate which is provided in the rear end of the vehicle, the peripheral flange of the garnish projects from the garnish toward the outer panel of the tailgate. In such a case, the based end portion of the mounting portion can be partly formed by a lower wall part of the peripheral flange so that the configuration of the mounting portion can be simplified. In particular, the connecting portion (9) may be connected to a bent part (15) of the peripheral flange that is formed as an inverted V-shaped groove (14) by being recessed inward. Thereby, the mechanical strength of the bent part of the peripheral flange can be increased by using a highly simple structure. As the connecting portion is connected to the bent part having a high mechanical strength, the deformation of the peripheral flange at the time of a crash can be controlled such that the connecting portion is ruptured in a reliable manner. In particular, when the peripheral flange forms a lower wall part of the exterior member, the moisture that may be deposited on the surface of the exterior member is guided along the lower part, and collected by the inverted V-shaped groove to be expelled from either lateral end of the inverted V-shaped groove when the tailgate is raised into the open position.

According to a preferred embodiment of the present invention, the lower wall part of the peripheral flange formed in a lower part thereof is provided with a V-shaped groove formed by being recessed outward in a part thereof inboard of the part thereof to which the connecting portion is connected, and a part of the lower wall part of the peripheral flange immediately adjacent to the part thereof to which the connecting portion is connected is formed with a drain hole. Thereby, when the moisture is collected in the V-shaped groove, the moisture can be dammed by the connecting portion, and can be expelled to the outside via the drain hole before reaching the connecting portion.

Preferably, the wall part of the base end portion defines a hollow interior of the base end portion, and the wall part of the projecting end portion defines a hollow interior of the projecting end portion, and the base end portion and the projecting end portions are dimensioned such that one of the base end portion and the projecting end portion is received in the hollow interior of the other when the connecting portion has ruptured under a crash load. Owing to this arrangement, by causing one of the base end portion and the projecting end portion to be dropped into the other upon the rupturing of the connecting portion, fragments that could be created by the rupture of the connecting portion can be trapped within the mounting portion, and the spilling of such fragments can be avoided. The hollowing interior may be defined not only by planar wall parts but also by arcuate wall parts. At any event, by dimensioning the various parts such that the projecting end portion is received within the base end portion upon rupturing of the connecting portion, the interference between the base end portion and the projecting end portion following the rupturing of the connecting portion can be avoided, and the base end portion and the projecting end portion are avoided from abutting each other so that the deformation of the outer panel under pressure from the mounting portion can be avoided.

The mounting structure for an automotive exterior member according to the present invention may further comprise a fastener (5) having a head (5a) retained by the projecting end portion and configured to be connected to the outer panel, the head of the fastener being received in the hollow interior of the projecting end portion, and the hollow interior of the projecting end portion having a length (B) greater than that (C) of the head as measured along the projecting direction. According to this arrangement, when the rear side of the exterior member is displaced toward the outer panel owing to the deformation of the exterior member caused by a crash, the head of the fastener is prevented from hitting the rear side of the exterior member before the projecting end portion abuts the rear side of the exterior member. Therefore, the permissible displacement of the exterior member with the fastener already retained thereby can be maximized. In the case of a light crash which causes the projecting end portion to abut the rear side of the exterior member, the head of the fastener is prevented from being damaged by the engagement with the rear side of the exterior member so that the fastener may continue to be used even after the repair.

Preferably, the projecting end portion has a substantially same length (A, B) as the base end portion as measured along the projecting direction. When the base end portion and the projecting end portion are arranged in tandem between the exterior member and the outer panel, because the two portions are provided with a substantially same length in the projecting direction which corresponds to the direction of the crash load, the base end portion and the projecting end portions are allowed to undergo a substantially same displacement so that the possible range of deformation of the mounting portion can be maximized.

Effect of the Invention

Thus, according to the present invention, when subjected to an impact load directed in the projecting direction of the base end portion and the projecting end portion which is perpendicular to the surface of the exterior member, the base end portion and the projecting end portion are allowed to be displaced relative to each other by a distance corresponding to the projecting length of the base end portion or the projecting end portion by the rupture of the connecting portion. Therefore, when the crash impact is small enough not to cause the base end portion to abut the outer panel or the projecting end to abut the exterior member, the resulting damage may be limited to the deformation of the exterior member, and the mounting portion is prevented from transmitting a pressure to the outer panel strong enough to deform the outer panel. Therefore, the repairing cost can be minimized.

PREFERRED EMBODIMENT OF THE INVENTION

Figure 1:
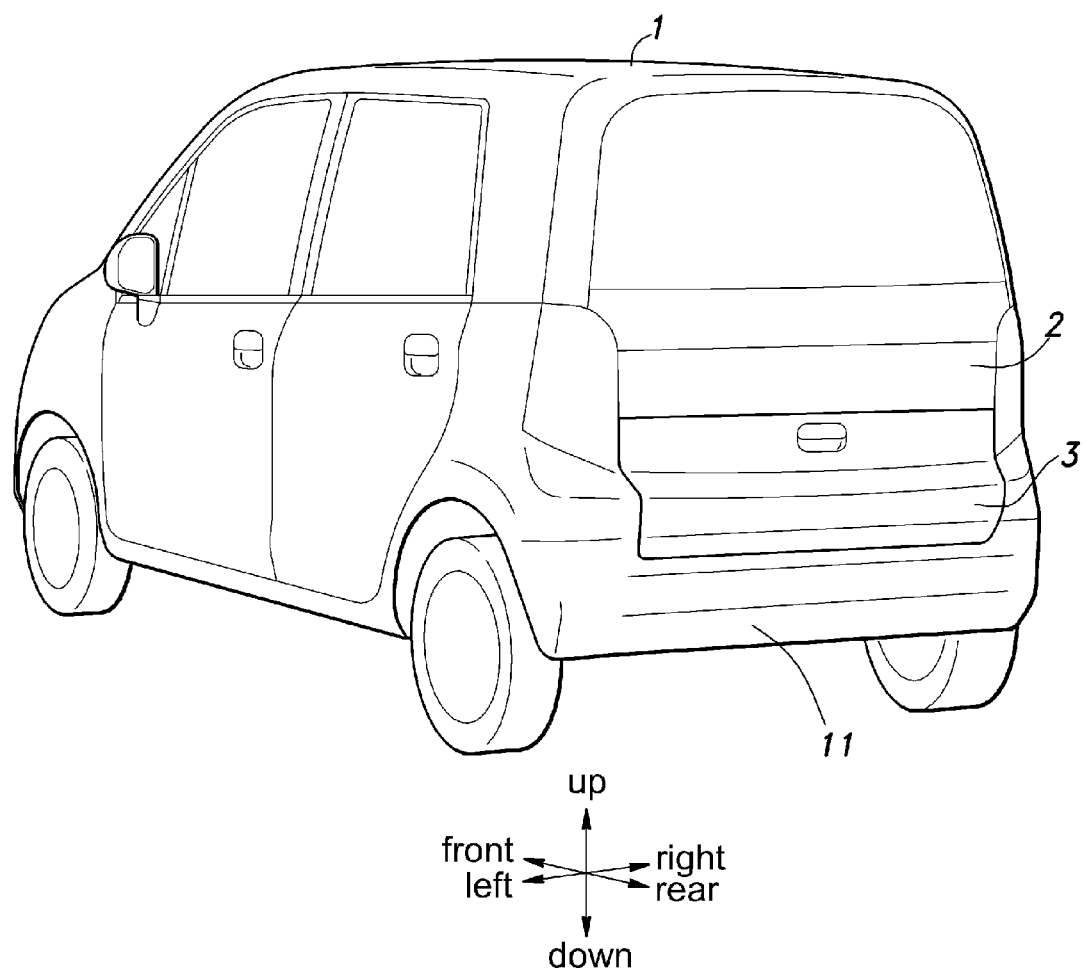
FIG. 1 is a perspective view of an automobile to which the invention has been applied as seen from a left rear direction.

Now the present invention is described in the following in more detail in terms of a concrete embodiment with reference to the appended drawings. FIG. 1 is a perspective view of an automobile to which the invention has been applied as seen from a left rear direction.

Referring to FIG. 1, a tailgate 2 (or a liftgate that can be opened by swinging upward) is provided in a rear end of a vehicle body 1, and an exterior member consisting of a lower garnish 3 is attached to an outer side of the tailgate 2. The present invention is not limited to this particular embodiment in which the lower garnish 3 is attached to the tailgate 2, but to any other arrangement where an exterior member is attached to a rear end of a vehicle body. The vertical and lateral directions indicated in the following description are based on the view point of a vehicle occupant seated in the vehicle body 1. The relative positioning of the various component parts are based on the assumption that the lower garnish 3 is already attached to the tailgate 2, and the tailgate 2 is closed.

Figure 2:
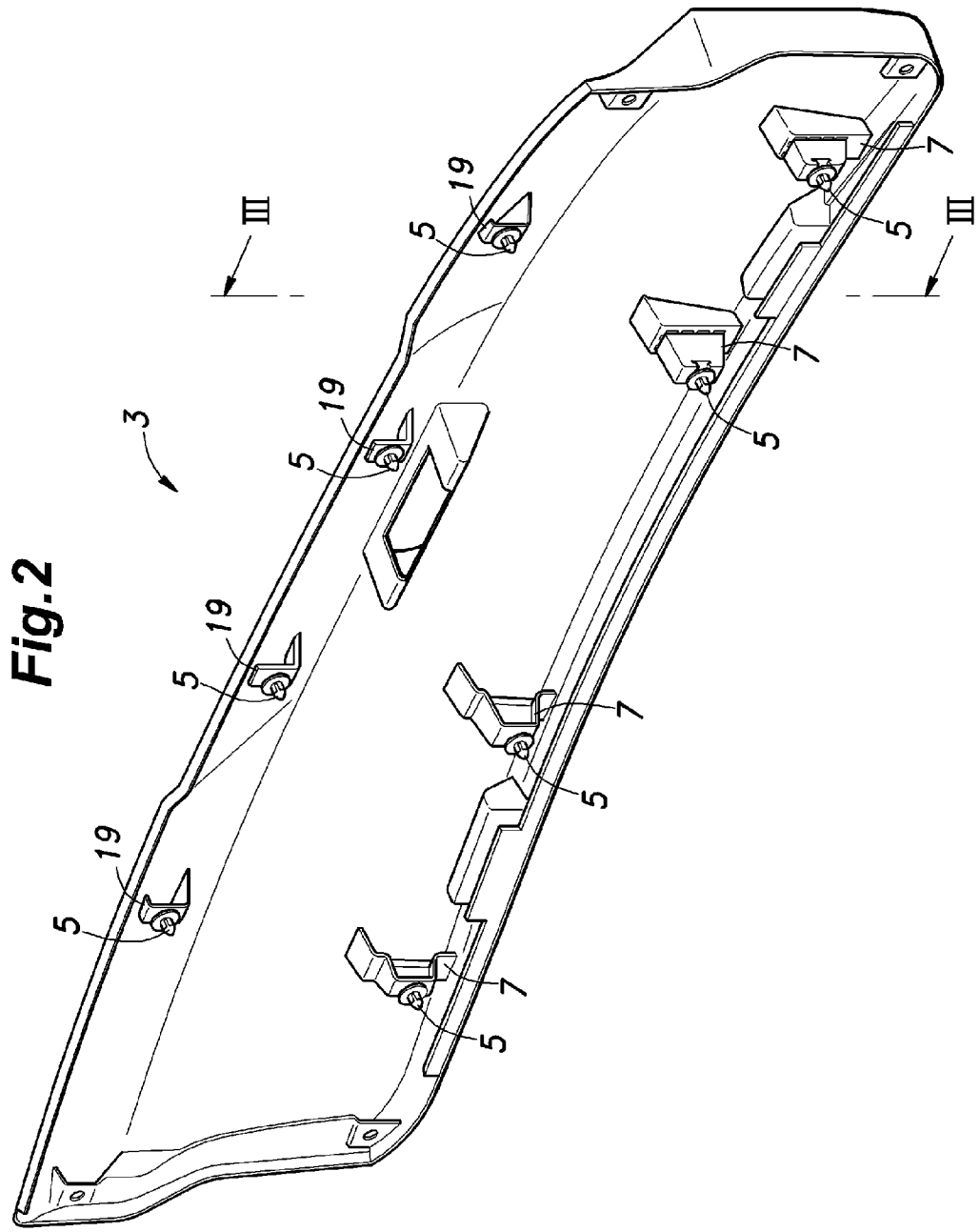
FIG. 2 is a general perspective view of a rear side of a lower garnish.
Figure 3:
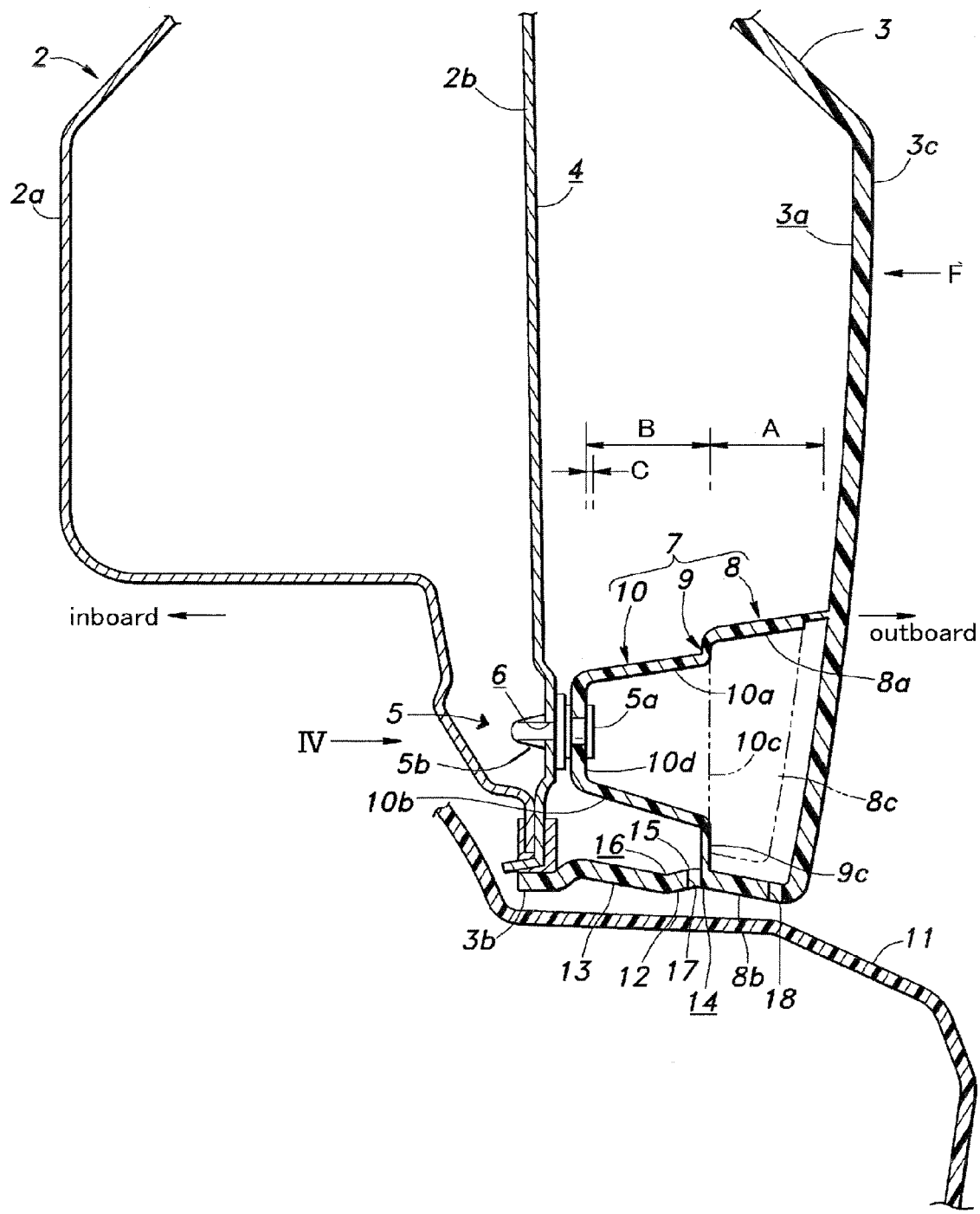
FIG. 3 is an enlarged fragmentary sectional side view taken along line III-III of FIG. 2.

FIG. 2 is a general perspective view of a rear side 3a of the lower garnish 3, and FIG. 3 is an enlarged fragmentary sectional side view of a lower part of the tail gate 2 taken along line III-III of FIG. 2. The tailgate 2 may consist of a per se known structure that includes an inner panel 2a facing the inside of the vehicle body 1 and an outer panel 2b defining the exterior surface of the vehicle body 1 which are joined to each other by spot welding or by hemming along the outer periphery thereof. The lower garnish 3 is attached to a lower part of the outer surface 4 of the outer panel 2b facing the exterior of the vehicle body 1.

The lower garnish 3 consists of a plate member manufactured by molding plastic material. A main body 3c formed by a plate member and defining the exterior surface of the lower garnish 3 is contoured by a curved surface that smoothly connects to the exterior surface of the outer panel of the vehicle body 1 so as to enhance the external appearance of the tail gate 2.

Fasteners consisting of clips 5 are used for attaching the lower garnish 3 to the outer panel 2b. The fasteners are not limited to clips 5 but may also consist of screws and rivets. A plurality of clip receiving holes 6 are formed in suitable parts of the outer panel 2b, and mounting portions 7 for retaining the clips 5 are integrally molded to the rear side 3a of the lower garnish 3 at parts thereof corresponding to the clip receiving holes 6 of the outer panel 2b. In the embodiment illustrated in FIG. 2, the mounting portions 7 are formed in four locations arranged laterally along the lower edge of the lower garnish 3. The upper part of the lower garnish 3 may be attached to the outer panel 2b by providing four mounting portions 19 in the lower garnish 3 and passing clips 5 that are retained by the mounting portions 19 into clip receiving holes (not shown in the drawings) formed in the outer panel 2b in a similar fashion. The lower garnish 3 is attached to the outer panel 2b by using the clips 5 in the illustrated embodiment, but the mounting portions 19 of the lower garnish 3 may also be integrally formed with engagement claws such that the claws may be directly engaged by corresponding holes formed in the outer panel 2b, instead of using the clips 5 or any other separate fasteners. Alternatively, the projecting ends of the mounting portions 7 may be welded or bonded to the outer panel 2b.

Figure 4:
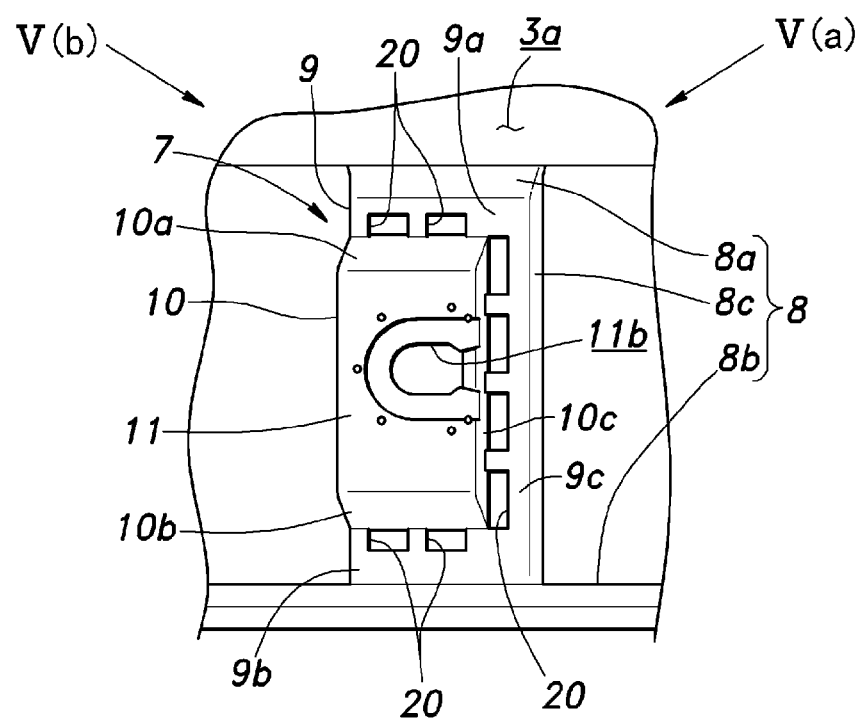
FIG. 4 is an enlarged fragmentary view as seen in the direction indicated by arrow IV in FIG. 3.

As shown in FIG. 3 also, each mounting portion 7 comprises a base end portion 8 projecting from the rear side 3a of the lower garnish 3 toward the outer panel 2b (in the direction of the movement of the lower garnish 3 at the time of a rear end crash of the vehicle body 1), a connecting portion 9 bent perpendicularly to the projecting end of the base end portion 8 and extending perpendicularly to the projecting direction of the base end portion 8, and a projecting end portion 10 projecting from the other end of the connecting portion 9 in the same direction as the projecting direction of the base end portion 8. The outer profile of the projecting end portion 10 is smaller than that of the base end portion 8 such that the former can be contained within the latter. In the illustrated embodiment, each mounting portion 7 is formed by a stepped plate member shaped such as to be formed by stacking a smaller trapezoidal shape on a larger trapezoidal shape as seen from sideways. In particular, as shown in FIG. 4, when seen in the projecting direction, the profiles of the base end portion 8 and the projecting end portion 10 do not coincide with each other. In the illustrated embodiment, as seen in the projecting direction of the base end portion 8, the outer profile of the projecting end portion 10 is confined within the outer profile of the base end portion 8 on the projected plane.

The lower end and the lateral ends of the lower garnish 3 are curved toward the outer panel 2b, extends from the rear side 3a to the edge of the tailgate 2 (the inner panel 2a and the outer panel 2b) so as to define a peripheral flange that covers the lower part and the lateral side parts of the tailgate 2. A lower part of the peripheral flange is formed by a lower wall part 3b of the lower garnish 3. The lower wall part 3b extends along the upper surface of the rear bumper 11, and is given with a wavy shape by including a first slanted wall part 8b extending obliquely upward from the lower end of the main body 3c of the lower garnish 3, a second slanted wall part 12 extending obliquely downward from the free end of the first slanted wall part 8b and a third slanted wall part 13 extending obliquely upward from the free end of the second slanted wall part 12 to a point adjacent to the lower end of the outer panel 2b. The lower wall part 3b is shown as having a wavy shape in the illustrated embodiment, but each side end part of the lower garnish 3 may also be formed in a similar fashion.

Figure 5A:
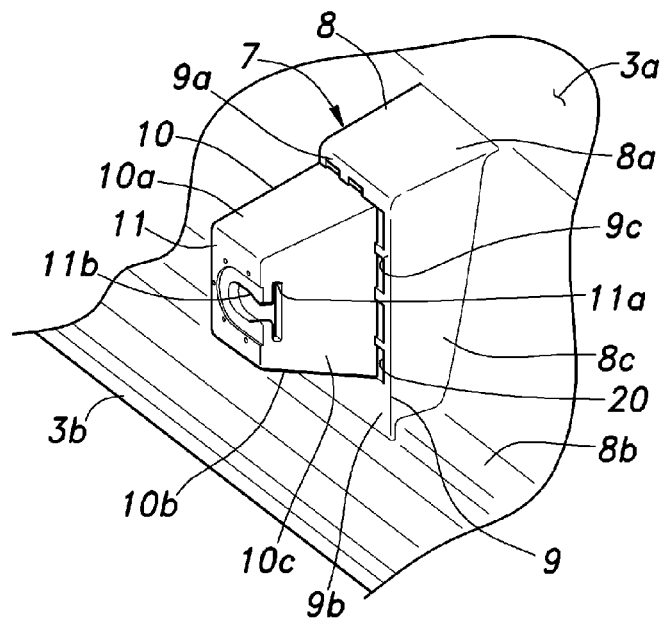
FIG. 5a is a perspective view as seen in the direction indicated by arrow V(a) in FIG. 4.
Figure 5B:
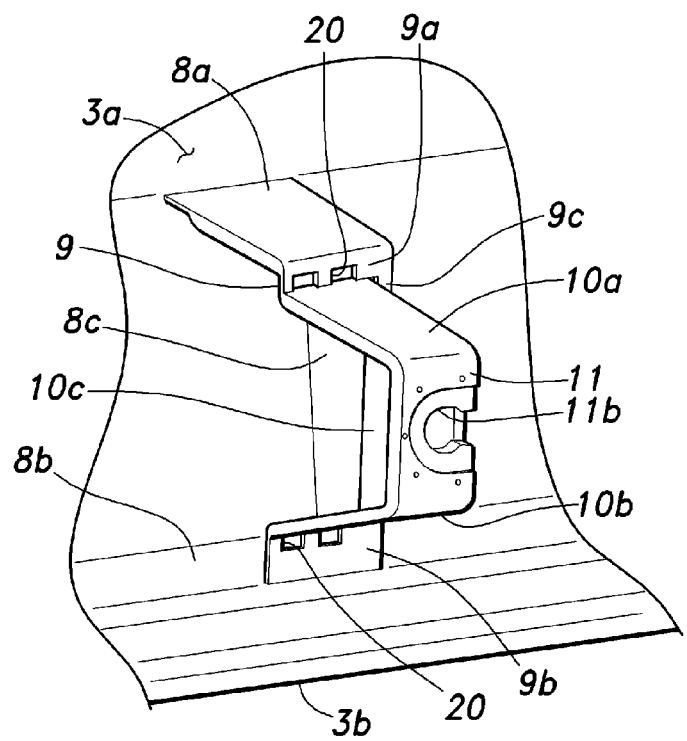
FIG. 5b is a perspective view as seen in the direction indicated by arrow V(b) in FIG. 4.

The mounting portions 7 are arranged along the lower end of the lower garnish 3. A part of the base end portion 8 is formed by the first slanted wall part 8b which also forms a part of the lower wall part 3b or the peripheral flange. Thus, the base end portion 8 is formed by the first slanted wall part 8b, an upper wall part 8a projecting from the rear side 3a of the lower garnish 3 opposite from the first slanted wall part 8b, and a side wall part 8c extending between the corresponding side edges of the first slanted wall part 8b and the upper wall part 8a as shown in FIGS. 4, 5a and 5b. The base end portion 8 is thus defined by a rectangular C-shaped upright wall and defines a hollow interior having a rectangular cross section. Thereby, the base end portion 8 can be molded by plastic material, and owing to the mechanical strength afforded by the wall on three sides, the deformation of the wall parts 8a, 8b and 8c can be avoided at the time of a light crash.

The connecting portion 9 integrally provided in each mounting portion 7 extends inward from the projecting ends of the upper wall part 8a, the first slanted wall part 8b and the side wall part 8c in a direction perpendicular to the projecting direction of the mounting portion 7. The connecting portion 9 consists of wall parts 9a, 9b and 9c that are thinner than the upper wall part 8a, the first slanted wall part 8b and the side wall part 8c of the base end portion 8 and extend inward as a cantilever into the space defined by the upper wall part 8a, the first slanted wall part 8b and the side wall part 8c. The wall parts 9a, 9b and 9c of the connecting portion 9 are entirely thin in the illustrated embodiment, but may include locally thinned parts instead. The wall parts 9a, 9b and 9c extend substantially perpendicularly to the upper wall part 8a, the first slanted wall part 8b and the side wall part 8c in the illustrated embodiment, but may also extend at an angle other than 90 degrees with respect to the projecting direction.

The projecting end portion 10 projects from the free ends or inner ends of the wall parts 9a, 9b and 9c of the connecting portion 9 in the same direction as the base end portion 8. The projecting end portion 10 includes an upper wall part 10a, a lower wall part 10b and a side wall part 10c placed on three sides similarly as the wall parts of the base end portion 8, and is further provided with a retaining portion 10d formed as a plate member extending across the free ends of the three wall parts 10a, 10b and 10c of the projecting end portion 10 for retaining a clip 5. Similarly as the base end portion 8, the projecting end portion 10 is formed by the three wall parts 10a, 10b and 10c arranged in a rectangular C-shape so as to define a hollow interior having a rectangular cross section. Thereby, the projecting end portion 10 can be molded by plastic material, and owing to the mechanical strength afforded by the wall on three sides, the deformation of the wall parts 10a, 10b and 10c can be avoided at the time of a light crash.

The clip 5 may consist of a per se known industrial fastener, and may include a flattened circular retaining head 5a, a stem coaxial with the head 5a and having a small diameter and a resilient engagement leg piece 5b formed on the stem. The retaining portion 10d is provided with an opening 11a formed in the side wall part 10c configured to receive the retaining head 5a and a U-shaped slot 11b formed in the retaining portion 10d and communicating with the opening 11a such that the retaining head 5a can be retained by inserting the retaining head 5a in the opening 11a from sideways and engaging the retaining head 5a with the face of the retaining portion 10d facing the rear side 3a and extending along the edge of the U-shaped slot 11b. The peripheral edge of the slot 11b is formed with a clip supporting seat. The width of the slot 11b adjoining the opening 11a is slightly narrowed so that the stem (neck) of the clip 5 may not be readily dislodged from the slot 11b.

The connecting portion 9 is given with a lower mechanical strength as compared with the base end portion 8 and the projecting end portion 10 against a load caused by a crash (rear end crash) which is directed in the direction indicated by arrow F in FIG. 3. In particular, a plurality of openings 20 is formed along the part of the connecting portion 9 adjoining the wall parts 10a to 10c of the projecting end portion 10 similarly as a row of perforations for facilitating the separation so that the connecting portion 9 includes a weakened part created by the openings 20. In particular, the side wall part 8a of the base end portion 8 is connected to the side wall part 10a of the projecting end portion 10 solely by such a weakened part such that the side part of the connecting portion 9 is weaker than the upper and lower parts thereof with respect to a load directing in the projecting direction.

Figure 6:
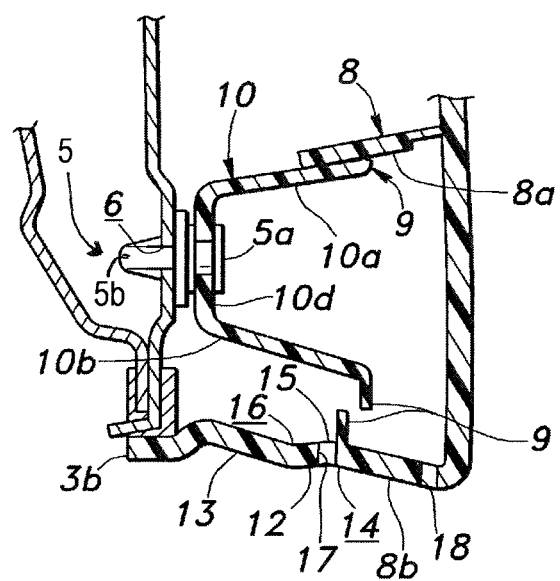
FIG. 6 is a fragmentary sectional side view showing a bridging portion ruptured by a crash event.

Thereby, the connecting portion 9 is caused to rupture preferentially over the other parts of the mounting portion 7. The base end portion 8 and the projecting end portion 10 are dimensioned such that the projecting end portion 10 is received by the hollow interior of the base end portion 8 defined by the wall parts 8a to 8c thereof when the projecting end portion 10 is separated from the base end portion 8 by the rupture of the connecting portion 9 as shown in FIG. 6. As the lower garnish 3 is allowed to deform to an extent afforded by the movement of the projecting end portion 10 into the base end portion 8, the outer panel 2b is prevented from being deformed by the pressure from the mounting portion 7 that is applied to the panel outer surface 4 in case of a light crash. Therefore, at the time of a light crash, the owner of the vehicle is only required to replace the lower garnish 3, and can avoid the high cost of having the outer panel 2b repaired.

The projecting length of the base end portion 8 (or the upper wall part 8a thereof) from the rear side 3a (indicated by A in FIG. 3) may be equal to the projecting length of the projecting end portion 10 from the connecting portion 9 (indicated by B in FIG. 3) so that the possible relative displacement between the projecting end portion 10 and the base end portion 8 may be maximized. Thereby, the range of the severity of crashes that can be coped with by the replacement of the lower garnish can be maximized.

The retaining head 5a is located inside the hollow interior defined by the wall parts 10a to 10c of the projecting end portion 10, and the axial thickness (indicated by C in FIG. 3) of the retaining head 5a is shorter than the projecting length B of the projecting end portion 10 from the retaining portion 10d toward the rear side 3a of the lower garnish 3 (C<B). Therefore, when the rear side 3a comes close to the retaining head 5a as a result of the rupture of the connecting portion 9, the rear side 3a does not come into contact with the retaining head 5a, and the deformation of the outer panel 2b caused by the concentration of the crash load on the outer panel 2b via the retaining head 5a can be avoided.

In the upper part of the mounting portion 7, the upper wall part 8a of the base end portion 8 is continuously connected to the upper wall part 10a of the projecting end portion 10 via the connecting portion 9 so that the two wall parts 8a and 10a are connected in a crank-shape via the connecting portion 9. In particular, the vertical offset between the two wall parts 8a and 10a is minimized so that the two wall parts are placed adjacent to each other. Therefore, upon rupturing of the connecting portion 9 at the time of a crash, the two wall parts 8a and 10a are allowed to guide the relative movement between them, and the main body 3c of the lower garnish 3 is allowed to be displaced in a stable manner so that the lower part of the lower garnish 3 is prevented from engaging and damaging a rear bumper 11 even through the mounting portion 7 is provided in a lower part of the lower garnish 3 or near the rear bumper 11. The bent shape formed by the wall parts 8a and 9a of the base end portion 8 and the connecting portion 9 is not limited to the perpendicularly bent shape in the crank shape of the illustrated embodiment, but the wall part 9a of the connecting portion 9 may extend at an angle (any angle including 90 degrees) from the wall part 8a of the base end portion 8 with respect to the projecting direction thereof.

When the connecting portion 9 has ruptured at the time of a light crash, the upper wall part 8a of the base end portion 8 integral with the lower garnish 3 which moves as a result of the light crash rides on the upper wall part 10a of the projecting end portion 10 which is fixed to the outer panel 2b having a relatively high mechanical strength. As a result, after the light crash, the upper wall part 8a of the base end portion 8 is placed on the upper wall part 10a defining the upper surface of the projecting end portion 10 so that the lower garnish 3 is prevented from dropping off from the vehicle body 1 owing to the upper mounting portions 19 even though the firm securing action of the mounting portions 7 may be lost. Therefore, the vehicle operator is allowed to travel to the repair shop without the need to forcibly rip off the lower garnish or otherwise put the vehicle into a roadworthy state.

The connecting portion 9 was provided with a plurality of breaks in the form of perforations in the foregoing embodiment, but may also consist of any other structure such as thin-walled portions and V-notches as long as the structure is configured to cause the connecting portion 9 to preferentially rupture upon application of a crash load to the mounting portion 7.

As shown in FIG. 3, the first slanted wall part 8b is bent with respect to the second slanted wall part 12 at a bent portion 15 such that the two slanted wall parts 8b and 12 both slant downwards from the bent portion 15 (radially outward with respect to the peripheral flange including the lower wall part 3b). Therefore, an inverted V-shaped groove 14 is formed on the surface of the lower wall part 3b as seen from below. The inverted V-shaped groove 14 extends in the lateral direction of the vehicle body, and opens out at each lateral end thereof. Therefore, when the tailgate 2 is upwardly tilted to open the rear end of the vehicle body 1, the lower wall part 3b faces upward, and moisture that may be deposited on the surface (outboard surface) of the lower garnish 3 is collected by the inverted V-shaped groove 14, and is expelled from the lateral ends of the tailgate 2. Therefore, the user is prevented from getting wet when opening the tailgate after it has rained.

The lower part of the connecting portion 9 of the mounting portion 7 is connected to the bent portion 15 between the first slanted wall part 8b and the second slanted wall part 12. A V-shaped groove 16 is formed between the second slanted wall part 12 and the third slanted wall part 13 as seen from above. Therefore, when moisture that has passed into the gap between the outer panel 2b and the lower garnish 3 is deposited on the lower wall part 3b, the moisture is collected in the V-shaped groove 16. This V-shaped groove 16 extends laterally of the vehicle body, and is closed at each lateral end by a lateral side wall part of the lower garnish 3. Therefore, it is advantageous to form a drain hole 17 that is passed through the thickness of the second slanted wall part 12 at a part of the second slanted wall part 12 adjacent to the connecting portion 9 forming a part of the V-shaped groove 16. Thereby, the moisture that may be trapped in the V-shaped groove 16 and dammed by the connecting portion 9 can be expelled to the outside.

An additional drain hole 18 is passed across the thickness of the first slanted wall part 8b at a part thereof where a corner is defined by cooperation between the rear side 3a and the first slanted wall part 8b. Therefore, the moisture that has moved over the second slanted wall part 12 and reached the first slanted wall part 8b is expelled to the outside from the lowest part of the first slanted wall part 8b. The foregoing embodiment was directed to the lower garnish provided on the lower part of the tail gate, but the present invention is not limited by this embodiment, and is equally applicable to a garnish attached to a lower part of a side door. In the latter case, the advantageous effect can be obtained at the time of a side crash, instead of a rear end crash.

The planar wall parts 8a to 8c of the base end portion 8 were arranged in the shape of a rectangular letter C and so were the planar wall parts 10a to 10c of the projecting end portion 10 in the foregoing embodiment. However, according to a broad concept of the present invention, the wall parts may be arranged in the shape of letter L by arranging two planar wall parts in a mutually perpendicular relationship or in the shape of letter V. Also, the wall parts are not necessarily required to be planar, or may have arcuate and other cross sectional shapes.

GLOSSARY 1 vehicle body
2 tailgate
2b outer panel
3 lower garnish (exterior member)
3a rear side
3c main body
4 panel outer surface
5 clip (connecting member)
5a retaining head
7 mounting portion
8 base end portion
8a upper wall part
8b first slanted wall part
8c side wall part
9 connecting portion
10 projecting end portion
10a upper wall part
10b lower wall part
10c side wall part
10d retaining portion
14 inverted V-shaped groove
15 bent portion
16 V-shaped groove
17 drain hole
18 additional drain hole
19 upper mounting portions
20 openings

The invention claimed is:

1. A mounting structure for an automotive exterior member for attaching the exterior member to an outer surface of an outer panel defining an exterior surface of a vehicle body, wherein:

the exterior member comprises a rear side opposing an outer surface of the outer panel at a certain distance and a mounting portion projecting from the rear side of the exterior member toward the outer panel for securing the exterior member to the outer panel;

the mounting portion includes a base end portion projecting from the rear side toward the outer surface of the outer panel, a projecting end portion projecting from the base end portion toward the outer panel and configured to be connected to the outer surface of the outer panel and a connecting portion connecting the projecting end portion with the base end portion; and the connecting portion is configured to be mechanically weaker than the base end portion and the projecting end portion against a crash load directed in a projecting direction of the mounting portion' wherein the projecting end portion and the base end portion are provided with wall parts, respectively, that extend in the projecting direction and are joined to each other via the connecting portion, the connecting portion including a wall part that extends from the wall part of the base end portion at an angle to the projecting direction, wherein the exterior member consists of a garnish provided with a peripheral flange extending toward the outer panel, and a part of the wall part of the base end portion is formed by the peripheral flange, and wherein the connecting portion is connected to a bent part of the peripheral flange that is formed as an inverted V-shaped groove by being recessed inward.

2. The mounting structure for an automotive exterior member according to claim 1, wherein the wall part of the base end portion includes a part that is located above an upper surface of the wall part of the projecting end portion.

3. The mounting structure for an automotive exterior member according to claim 1, wherein the wall part of the connecting portion is substantially perpendicular to the wall part of the base end portion.

4. The mounting structure for an automotive exterior member according to claim 1, wherein the wall part of the connecting portion includes a thin walled portion.

5. The mounting structure for an automotive exterior member according to claim 1, wherein the wall part of the connecting portion is provided with a plurality of openings.

6. The mounting structure for an automotive exterior member according to claim 1, wherein a lower wall part of the peripheral flange formed in a lower part thereof is provided with a V-shaped groove formed by being recessed outward in a part thereof inboard of the part thereof to which the connecting portion is connected, and a part of the lower wall part of the peripheral flange immediately adjacent to the part thereof to which the connecting portion is connected is formed with a drain hole.

7. The mounting structure for an automotive exterior member according to claim 1, wherein the wall part of the base end portion defines a hollow interior of the base end portion, and the wall part of the projecting end portion defines a hollow interior of the projecting end portion, and the base end portion and the projecting end portions are dimensioned such that one of the base end portion and the projecting end portion is received in the hollow interior of the other when the connecting portion has ruptured under a crash load.

8. The mounting structure for an automotive exterior member according to claim 7, further comprising a fastener having a head retained by the projecting end portion and configured to be connected to the outer panel, the head of the fastener being received in the hollow interior of the projecting end portion, and the hollow interior of the projecting end portion having a length greater than that of the head as measured along the projecting direction.

9. The mounting structure for an automotive exterior member according to claim 1, wherein the projecting end portion has a substantially same length as the base end portion as measured along the projecting direction.

\* \* \* \* \*